United States Patent Office 3,452,100
Patented June 24, 1969

3,452,100
PROCESS FOR PREPARING DIALKYL DISULFIDES
Clifton F. Bennett and Warren S. MacGregor, Camas, Wash., assignors to Crown Zellerbach Corporation, San Francisco, Calif., a corporation of Nevada
No Drawing. Filed Dec. 16, 1966, Ser. No. 602,156
Int. Cl. C07c 149/12, 149/02
U.S. Cl. 260—608                           8 Claims

ABSTRACT OF THE DISCLOSURE

A process for preparing dialkyl disulfides from alkaline alkyl mercaptides by forming a reaction mixture of the alkaline alkyl mercaptide and sulfur or a sulfur-containing compound, acidifying the reaction mixture to a pH between about 8 and 11, and separating the dialkyl disulfide that is formed. Any polysulfides that are formed may be be recirculated back to act as a sulfur source in the formation of fresh reaction mixture.

Background of the invention

This invention relates to process of preparing dialkyl disulfides from the alkaline alkyl mercaptides contained in waste caustic extract streams, and, more specifically, the waste caustic extract stream resulting from the production of dimethyl sulfide from the waste liquors obtained in the pulping of wood.

The production of dimethyl sulfide from the waste liquor obtained in the pulping of wood is well known and is described in U.S. Patent No. 2,816,832 and in Chemical Engineering, June 26, 1962, pp. 100–102. Briefly, this process comprises adding sulfur to the black liquor obtained from the kraft pulping of lignocellulose, reacting the resulting mixture for a period of time at an elevated temperature, separating the resultant dimethyl sulfide from the demethylated black liquor, separating the alkaline methyl mercaptide and miscellaneous salts from the dimethyl sulfide by caustic extraction, and recovering the dimethyl sulfide which may be further purified by distillation.

Until now, it has been the practice to recirculate the caustic extract either back to the pulp mill, where it is processed along with the pulping waste liquors in conventional recovery systems, or recirculating the caustic extract to the waste liquor input to the dimethyl sulfide reactor.

It has now been found that this caustic extract, containing primarily an alkaline methyl mercaptide as the principal reactant thereof, may be reacted in a particular manner to be desired to recover dimethyl disulfide therefrom.

It is known to react methyl mercaptan with sulfur dissolved in an aqueous sodium hydroxide solution to form dimethyl disulfide. Such a process is described by Holmberg, Liebig's Annalen, vol. 359, pp. 81 and 82 (1908). Such a process is also described in the recently issued U.S. Patent No. 3,275,693, to Bapseres et al. in which certain critical ratios of the reactants are described.

It has been found that these procedures are generally unsatisfactory for producing dimethyl disulfide from the caustic extract obtained from the dimethyl sulfide process described above. Yields of dimethyl disulfide are low, and there is a predomination of side reactants, such as dimethyl trisulfide.

Summary of the invention

Briefly, the present invention contemplates the recovery of a dialkyl disulfide from a caustic extract containing an alkaline alkyl mercaptide by reacting the caustic extract with a source of sulfur, such as sulfur or a sulfur-containing compound, acidifying the resultant reaction mixture to a pH of below about 11 and preferably above about 8, and recovering the resultant dialkyl disulfide from the reaction mixture. The present invention also resides in discovering that polysulfides formed during the reaction may be recycled and act as a source of sulfur in the reaction.

Description of the preferred embodiments

The following preferred embodiments will be illustrated by reference to sodium methyl mercaptide as the alkaline alkyl mercaptide. It is to be understood, however, that this is for purposes of illustration and is not intended to be limiting.

The over-all reaction involved in the process described herein may be represented by the following equation:

(1)   $2\text{NaSCH}_3 + \text{S} \xrightarrow{\text{(acidification)}} \text{CH}_3\text{SSCH}_3 + \text{Na}_2\text{S}$

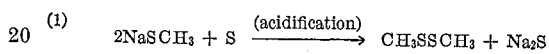

The dimethyl disulfide thus obtained is useful as a solvent, soil sterilant, and as an intermediate raw material for the manufacture of more complex organic sulfur compounds, such as methane sulfonyl chloride and others.

The first step in the production of dimethyl disulfide from the caustic extract containing sodium methyl mercaptide is the addition of sulfur thereto. While elemental sulfur is preferred because of economy and availability, other sulfur-containing compounds may be employed such as inorganic and organic polysulfides. The addition of sulfur to the caustic extract is accomplished by any suitable means, such as mixing the two together in a suitable mixing vessel.

The amount of sulfur added to the caustic extract should desirably be between about 0.4 to 0.6 gram atoms per mole of sodium methyl mercaptide calculated as methyl mercaptan. If too much sulfur is added, the reaction tends more toward the formation of dimethyl trisulfide rather than dimethyl disulfide. However, sufficient sulfur to react with all of the alkaline alkyl mercaptide should be employed.

The hold time of the caustic extract-sulfur reaction mixture does not appear to be critical, and acidification may be effected as soon as the sulfur is in solution.

The sulfur and caustic extract mixture is next acidified to a pH of between about 8 to 11 and preferably between about 9 to 10.5. This acidification step may be carried out by the employment of various inorganic mineral acids, such as sulfuric, hydrochloric, phosphoric, or by the employment of certain acid gases, such as $SO_2$ or $H_2S$.

The acidification of the sulfur and caustic extract mixture is essential in order to obtain good yields of the dimethyl disulfide. It has been found that in order to form dimethyl disulfide the sodium methyl mercaptide present in the caustic extract should desirably be present in the form of methyl mercaptan in order for the reaction with the sulfur to proceed at a reasonable rate. It is believed that there is an equilibrium reaction between the sodium methyl mercaptide and water in the aqueous caustic extract solution, as illustrated by the following equation:

(2)   $\text{NaSCH}_3 + \text{H}_2\text{O} \rightleftharpoons \text{NaOH} + \text{HSCH}_3$

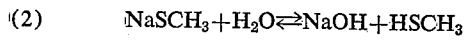

It can be seen from the foregoing Equation 2 that the removal of sodium hydroxide tends to drive the reaction toward the formation of methyl mercaptan. Therefore, the function of the acidifcation step is believed to be the removal of the sodium hydroxide formed in reaction 2 which promotes the formation of the more reactive methyl mercaptan.

The concentration of the acid or acid gas employed does not appear to be critical, and may be concentrated or dilute.

The amount of acid added during acidification step should be such as to give the reaction mixture a pH between about 8 and 11. If the pH is above about 11, the yield of dimethyl disulfide is considerably lowered. While a pH of less than 8.0 may be employed, there is an excessive formation of hydrogen sulfide and carbon dioxide in addition to the fact that the extra cost of the acid is uneconomical.

The temperature at which the acidification reaction is carried out is not critical and may vary from the freezing point of the reaction mixture up to about the boiling point thereof. At higher temperatures there is an increased tendency for methyl mercaptan to be lost by vaporizing during the acidification step, and this should be minimized.

The time required to effect the acidification is independent of temperature and acid concentration, and occurs substantially instantaneously.

Localized areas of excess acidity may occur at the point of addition and prior to complete dispersion of the acid in the reaction mixture. Such localized areas of acidity occur more readily where concentrated acid is employed. While such localized areas of acidity are not serious, they could lead to the loss of hydrogen sulfide, carbon dioxide and/or methyl mercaptan from the reaction mixture. Such loss may be avoided by employing less concentrated acid, improved mixing of the acid into the reaction mixture, or employing an enclosed reaction chamber.

Following the acidification step, the dimethyl disulfide that is formed may be separated from the remainder of the reaction mixture by simple decantation. The resulting dimethyl disulfide may be further purified by removing $SO_2$ and $H_2S$ therefrom by caustic extraction. Further purification may be effected by conventional means such as distillation.

The following examples illustrate the formation of dimethyl disulfide by the process described. These examples are illustrative only, and are not to be construed as limiting the invention.

Example 1

Caustic extract obtained from the extractor in the dimethyl sulfide process described previously had a pH of 13.0. The caustic extract contained approximately 5.6% by weight sodium methyl mercaptide and 6.8% by weight salts (which consisted primarily of sodium sulfide, sodium carbonate and sodium hydroxide), with the remainder being water. To 500 grams of the spent caustic extract, 8.4 grams (0.252 moles) of U.S.P. sulfur was dissolved at 23° C. to 24° C. over a period of two hours at atmospheric pressure. Following the sulfur addition, 132 grams of 12 N sulfuric acid was added to lower the pH to 8.0. The temperature rose to 45° C. during addition of the acid. The acidification was carried out at atmospheric pressure. A crude dimethyl disulfide layer was decanted off from the reaction mixture and weighed 23.0 grams. Chromatographic analysis showed the product to be 91% dimethyl disulfide, 4% dimethyl trisulfide, and 5% miscellaneous low boiling compounds. The yield, based upon the methyl mercaptan contained in the caustic extract, was 80% of theoretical.

The following example illustrates the importance of the acidification step in the production of dimethyl disulfide by the presently described process.

Example 2

Methyl mercaptan dissolved in sodium hydroxide was reacted with sulfur. The molar ratio of the sodium hydroxide to the sulfur was varied, and the amounts of acid added was also varied from none up to 1.4 moles per mole of methyl mercaptan. The results are reported in the following table:

TABLE 1.—REACTION OF SULFUR WITH METHYL MERCAPTAN

| Moles/mole $CH_3SH$ | | | Max. temp., ° C. | Time, hr. | Yield, percent of theoretical [1] |
|---|---|---|---|---|---|
| NaOH | Sulfur | Acid | | | |
| 1 | 0.57 | 0 | 53 | 3 | 0 |
| 1 | 0.57 | 0 | 95 | 3 | 0 |
| 1.17 | 0 | 0 | 120 | 2 | 0 |
| 1.8 | 1 | 0 | 100 | 2 | 24 |
| 0.8 | 0.33 | 0 | 100 | 1 | 48 |
| 1.2 | 1.0 | 1.3 | 100 | 1½ | 82 |
| 0.85 | 0.92 | 1.2 | 100 | 1½ | 88 |
| 0.92 | 0.50 | 1.4 | 100 | 1½ | 85 |

[1] Total dimethyl disulfide and dimethyl trisulfide based on methyl mercaptan.

It is seen from the foregoing table that the addition of acid to the reaction medium increases the yield from a maximum of about 50% with no acid present up to as high as 88%. As stated previously, acidification apparently promotes the transformation of sodium methyl mercaptide into methyl mercaptan, which appears to be the more reactive form.

Example 3

The procedure of Example 1 was repeated except that the amount of sulfur added to the caustic extract was varied. The product composition obtained is set forth in the following table:

TABLE 2

| Sulfur [1] | Product composition, percent | |
|---|---|---|
| | DMDS | DMTS |
| .403 | 97 | 3 |
| .442 | 97 | 2 |
| .490 | 88 | 10 |
| .634 | 60 | 48 |
| .863 | 32 | 65 |
| .975 | 25 | 73 |

[1] Gram atoms per gram mole of sodium methyl mercaptide.

From the foregoing, it is seen that for maximum dimethyl disulfide production, the molar ratio of sulfur to methyl mercaptan should be between about 0.4 to 0.5. However, one of the additional features of the present invention resides in the fact that close control of the amount of sulfur added to the caustic extract is not required as any dimethyl trisulfide formed during the reaction may be recycled to the incoming caustic extract stream and serves as a source of sulfur during the reaction. Thus, the dimethyl trisulfide formed due to the presence of any excess of sulfur is not a waste product, and may be employed in the formation of additional dimethyl disulfide. Therefore, it has been found that to assure the presence of sufficient sulfur, it should be added at a rate slightly in excess of 0.5 gram atoms per gram mole of methyl mercaptan.

The following example illustrates how dimethyl trisulfide may act as a source of sulfur in the reaction with the caustic extract to form dimethyl disulfide:

Example 4

The procedure of Example 1 was followed except that in place of elemental sulfur, dimethyl trisulfide was added to the caustic extract prior to acidification. The amount of dimethyl trisulfide employed was 0.442 gram mole per mole of sodium methyl mercaptide. The yield of dimethyl disulfide was 95% of theoretical based on the dimethyl trisulfiide.

While the foregoing specific embodiments have been directed to the use of sodium methyl mercaptide as the alkaline alkyl mercaptide contained in the caustic extract, the reactions described may be employed with other alkaline alkyl mercaptides. Especially useful would be the alkaline lower alkyl mercaptides. By "lower alkyl" it is intended to include those alkyl groups having from 1 to 7 carbon atoms which, in addition to methyl, include ethyl, butyl, propyl, amyl, hexyl and heptyl. Alkaline lower alkyl mercaptides such as sodium ethyl mercaptide may be found in caustic extracts from certain petroleum industry processes such as gasoline "sweetening." The disulfides obtained employing the present process would be the corresponding di(lower alkyl) disulfides.

Example 5

This example illustrates the formation of various dialkyl disulfides other than dimethyl disulfide. The procedure of Example 1 is followed except that caustic dilutions of the various lower alkyl mercaptans set forth in Table 3 below is substituted for the sodium methyl mercaptide-containing caustic extract. The pH of these caustic dilutions is about 13.0.

TABLE 3

| Alkyl mercaptan | Dialkyl disulfide |
|---|---|
| Ethyl mercaptan | Diethyl disulfide |
| n-Propyl mercaptan | Di(n-propyl) disulfide |
| n-Butyl mercaptan | Di(n-butyl) disulfide |
| Tert-butyl mercaptan | Di(tert-butyl) disulfide |
| n-Amyl mercaptan | Di(n-amyl) disulfide |
| Tert-amyl mercaptan | Di(tert-amyl) disulfide |
| n-Hexyl mercaptan | Di(n-hexyl) disulfide |
| n-Heptyl mercaptan | Di(n-heptyl) disulfide |

The yield of the dialkyl disulfides obtained is above 80% of theoretical in each case.

We claim:
1. The method of preparing a dialkyl disulfide from an alkaline alkyl mercaptide comprising forming a reaction mixture of an alkaline alkyl mercaptide wherein the alkyl group contains from 1 to about 7 carbon atoms and sulfur in an amount sufficient to react with all of said alkaline alkyl mercaptide;
   acidifying said reaction mixture to a pH of between about 8.0 and about 11.0;
   separating the dialkyl disulfide that is formed from the reaction mixture;
   and recirculating any polysulfides that are formed to thereby form a portion of said sulfur source in the forming of fresh reaction mixture.
2. The method of claim 1 wherein said alkaline alkyl mercaptide is sodium methyl mercaptide.
3. The method of claim 1 wherein said sulfur source is elemental sulfur.
4. The method of claim 1 wherein said alkaline alkyl mercaptide is sodium methyl mercaptide, and said sulfur source is elemental sulfur.
5. The method of preparing a dialkyl disulfide from an alkaline alkyl mercaptide comprising forming a reaction mixture of an alkaline alkyl mercaptide wherein the alkyl group contains from 1 to about 7 carbon atoms and sulfur in an amount sufficient to react with all of said alkaline alkyl mercaptide;
   acidifying said reaction mixture to a pH between about 8.0 and about 11.0; and
   separating the dialkyl disulfide that is formed from the reaction mixture.
6. The method of claim 5 wherein said alkaline alkyl mercaptide is sodium methyl mercaptide.
7. The method of claim 5 wherein said alkaline alkyl is elemental sulfur.
8. The method of claim 5 wherein said alkaline alkyl mercaptide is sodium methyl mercaptide, and said sulfur source is elemental sulfur.

References Cited

UNITED STATES PATENTS 3,275,693  9/1966  Bapsères et al. _____ 260—608

Holmberg: Ann. der Chemie, vol. 359 (1908), pp. 81–83.

JOSEPH P. BRUST, *Primary Examiner.*

D. R. PHILLIPS, *Assistant Examiner.*